(12) United States Patent
Kataoka

(10) Patent No.: US 8,651,992 B2
(45) Date of Patent: Feb. 18, 2014

(54) SPEED REDUCER, ROBOT HAND AND ROBOT

(75) Inventor: Yuya Kataoka, Chino (JP)

(73) Assignee: Seiko Epson Corporation (JP)

( * ) Notice: Subject to any disclaimer, the term of this patent is extended or adjusted under 35 U.S.C. 154(b) by 75 days.

(21) Appl. No.: 13/424,909

(22) Filed: Mar. 20, 2012

(65) Prior Publication Data

US 2012/0244982 A1   Sep. 27, 2012

(30) Foreign Application Priority Data

Mar. 22, 2011   (JP) .................................. 2011-062533

(51) Int. Cl.
*F16H 1/32* (2006.01)

(52) U.S. Cl.
USPC ............................ 475/162; 475/346; 475/347

(58) Field of Classification Search
USPC .................................................. 475/346, 347
See application file for complete search history.

(56) References Cited

U.S. PATENT DOCUMENTS

| | | | |
|---|---|---|---|
| 2,720,434 A | 10/1955 | Trbojevich | |
| 3,013,447 A | 12/1961 | Hils et al. | |
| 3,430,523 A | 3/1969 | Merritt | |
| 3,994,187 A | 11/1976 | Milenkovic | |
| 4,407,544 A * | 10/1983 | Bahring | 475/162 |
| 4,612,822 A | 9/1986 | Nishikawa et al. | |
| 4,619,156 A | 10/1986 | Kiryu | |
| 4,770,062 A * | 9/1988 | Minegishi | 475/162 |
| 4,799,396 A | 1/1989 | Ito | |
| 4,803,891 A | 2/1989 | Takahashi | |
| 4,843,911 A * | 7/1989 | Minegishi et al. | 475/162 |
| 4,898,065 A | 2/1990 | Ogata et al. | |
| 5,033,877 A | 7/1991 | Bowen | |
| 5,725,452 A | 3/1998 | Droulon et al. | |
| 6,021,686 A | 2/2000 | Mizoguchi | |
| 6,155,950 A | 12/2000 | Minegishi et al. | |
| 6,378,206 B1 | 4/2002 | Minegishi et al. | |
| 6,450,913 B1 | 9/2002 | Strowik et al. | |
| 6,561,306 B2 | 5/2003 | Watanabe et al. | |
| 6,857,785 B2 | 2/2005 | Takahashi et al. | |
| 7,303,499 B2 | 12/2007 | Klindworth | |
| 7,308,876 B2 | 12/2007 | Schafer et al. | |
| 7,316,211 B2 | 1/2008 | Klindworth | |
| 7,351,177 B2 | 4/2008 | Christ | |

(Continued)

FOREIGN PATENT DOCUMENTS

| | | |
|---|---|---|
| JP | 59-106744 | 6/1984 |
| JP | 59-231242 | 12/1984 |

(Continued)

*Primary Examiner* — Derek D Knight
(74) *Attorney, Agent, or Firm* — Harness, Dickey & Pierce, P.L.C.

(57) ABSTRACT

Through holes are formed in a revolving gear which revolves while being engaged with a ring gear, and penetration pins are inserted in the through holes. An elastic member having a circular ring shape, which is formed so that an inner diameter thereof can move with respect to an outer diameter thereof, is mounted to either an inner circumferential surface of the through hole or an outer circumferential surface of the penetration pin. Thus, the through hole and the penetration pin do not interfere with each other, and thus, it is possible to set a small clearance between the through hole and the penetration pin to such a degree, while preventing a speed reducer from being in a locked state due to interference. As a result, it is possible to suppress a backlash between the through hole and the penetration pin.

6 Claims, 11 Drawing Sheets

(56) References Cited

U.S. PATENT DOCUMENTS

| | | |
|---|---|---|
| 7,360,464 B2 | 4/2008 | Xue et al. |
| 7,901,317 B2 | 3/2011 | Yamamoto et al. |
| 8,047,943 B2 | 11/2011 | Nakamura |
| 2010/0009801 A1 | 1/2010 | Nakamura |
| 2010/0113206 A1 | 5/2010 | Wang et al. |
| 2012/0244981 A1* | 9/2012 | Yamamoto .............. 475/162 |
| 2012/0244983 A1* | 9/2012 | Kusumoto .............. 475/162 |
| 2012/0244984 A1* | 9/2012 | Yamamoto et al. ...... 475/162 |
| 2012/0258835 A1* | 10/2012 | Kataoka et al. ......... 475/178 |
| 2012/0325040 A1* | 12/2012 | Yamamoto .............. 475/162 |

FOREIGN PATENT DOCUMENTS

| | | |
|---|---|---|
| JP | 60-095235 | 5/1985 |
| JP | 63-199944 | 8/1988 |
| JP | 63-225746 | 9/1988 |
| JP | 02-120553 | 5/1990 |
| JP | 04-290643 | 10/1992 |
| JP | 04-290644 | 10/1992 |
| JP | 05-079537 | 3/1993 |
| JP | 05-296301 | 11/1993 |
| JP | 07-253119 | 10/1995 |
| JP | 08-240258 | 9/1996 |
| JP | 08-303558 | 11/1996 |
| JP | 11-082041 | 3/1999 |
| JP | 2000-130521 | 5/2000 |
| JP | 2000-240763 | 9/2000 |
| JP | 2001-163229 | 6/2001 |
| JP | 2002-235825 | 8/2002 |
| JP | 2002-362385 | 12/2002 |
| JP | 2003-247631 | 9/2003 |
| JP | 2003-341530 | 12/2003 |
| JP | 2004-225732 | 8/2004 |
| JP | 2006-503214 | 1/2006 |
| JP | 2006-503237 | 1/2006 |
| JP | 2006-029393 | 2/2006 |
| JP | 2007-196980 | 8/2007 |
| JP | 2007-198445 | 8/2007 |
| JP | 2007-240003 | 9/2007 |
| JP | 2008-240852 | 10/2008 |
| JP | 2009-092220 | 4/2009 |
| JP | 2009-103276 | 5/2009 |
| JP | 2009-108964 | 5/2009 |
| JP | 2009-161073 | 7/2009 |

* cited by examiner

COMPONENT a

COMPONENT b

SPEED REDUCER, ROBOT HAND AND ROBOT

BACKGROUND

1. Technical Field

The present invention relates to a speed reducer which reduces an input rotational speed to be output.

2. Related Art

Most of the power obtained from a power source such as a motor is too high in its rotational speed or is too insufficient to be used as it is. In this respect, a technique has been typically used in which the rotational speed is reduced to an appropriate rotational speed using a speed reducer to generate a necessary rotational number and a necessary torque.

As a speed reducer which obtains a large reduction ratio, the following has been proposed. That is, a revolving gear which has a smaller size than a ring gear and has a smaller number of teeth (for example, by one tooth) than the ring gear is installed inside the ring gear. A circular cam is installed to be able to rotate with respect to the revolving gear in the central position of the revolving gear. A first rotational shaft is vertically installed in the circular cam in a position on the central axis of the ring gear. If the circular cam rotates around the central axis of the ring gear by the first rotational shaft, the revolving gear revolves around the central axis of the ring gear while being engaged with the ring gear. In such a configuration, while the revolving gear revolves around the central axis of the ring gear one turn, the revolving gear rotates in a direction opposite to its revolving direction by the teeth number difference with the ring gear. Thus, by extracting the rotating motion of the revolving gear, it is possible to considerably reduce the input rotational speed (rotational speed of the first rotational shaft).

The rotating motion of the revolving gear is extracted by a through hole formed in the revolving gear and a penetration pin inserted in the through hole. A clearance is formed between the through hole and the penetration pin. The rotating motion of the revolving gear is extracted by the penetration pin while the revolving motion of the revolving gear is being absorbed by the clearance. The rotating motion of the revolving gear extracted by the penetration pin in this way is output to the outside through a second rotational shaft to which the penetration pin is connected (JP-A-2008-240852).

However, in JP-A-2008-240852 as described above, there is a problem that a backlash easily occurs. That is, while the input of the first rotational shaft is output through the second rotational shaft, in addition to a normal backlash occurring in a portion where the ring gear and the revolving gear are engaged with each other, a backlash also occurs in a portion where the through hole and the penetration pin of the revolving gear are in contact with each other. The latter backlash occurs due to a manufacturing error in the speed reducer having an operation principle of JP-A-2008-240852, which easily causes a large backlash as a whole corresponding thereto. As a result, there is a problem that a period occurs during which an output torque is not obtained with respect to the input of the first rotational shaft, or a large rattling is generated in the second rotational shaft. For this reason, the size of the backlash is inspected after assembly, and if there is a problem, the speed reducer is disassembled, a specific component is changed into a component having a slightly different dimension, the speed reducer is assembled again, and the backlash is then inspected. By repeating these processes, it is possible to achieve a speed reducer having a backlash of a predetermined size or less. Alternatively, the dimensions of all the components are measured and sorted in advance, and the speed reducer is assembled with the components combined so that a gap may not occur between the through hole and the penetration pin in assembly, which results in a considerably long time in assembly.

SUMMARY

An advantage of some aspects of the invention is to provide a speed reducer which is capable of suppressing a backlash from occurring in a portion where a through hole and a penetration pin of a revolving gear are in contact with each other, without sorting of component dimensions or assembly inspection, even with components having manufacturing errors.

An aspect of the invention is directed to a speed reducer including: a ring gear which is formed with a plurality of gear teeth on the inner circumference thereof; a revolving gear which is disposed inside the ring gear, is formed with a plurality of gear teeth on the outer circumference thereof and is engaged with the ring gear; a circular cam which is disposed to be able to rotate with respect to the revolving gear in a central position of the revolving gear; a first rotational shaft which is vertically installed in the circular cam on the central axis of the ring gear, and rotates the circular cam around the central axis to revolve the revolving gear around the central axis; a penetration pin which is inserted in a through hole formed in the revolving gear; a second rotational shaft which is disposed on the central axis of the ring gear, is connected to the penetration pin, and outputs its rotation according to the rotation of the revolving gear; and an elastic member which has a shape of a circular ring, is mounted to either an inner circumferential surface of the through hole or an outer circumferential surface of the penetration pin, and is formed so that an inner diameter of the circular ring is able to move with respect to an outer diameter of the circular ring.

In the speed reducer with such a configuration, if the circular cam rotates around the central axis of the ring gear by the first rotational shaft, the revolving gear revolves around the central axis while being engaged with the ring gear. Further, as described later in detail, the revolving gear rotates a little (by an angle corresponding to a teeth number difference between the ring gear and the revolving gear) in a direction which is opposite to its revolving direction while revolving. The rotating motion of the revolving gear is transmitted to the penetration pin which is inserted in the through hole of the revolving gear. The rotation of the revolving gear transmitted to the penetration pin in this way is reduced in speed with respect to an input rotation. The speed reduced rotation is output through the second rotational shaft connected to the penetration pin. Further, in the speed reducer according to this aspect of the invention, the elastic member of the circular ring shape is mounted to either the inner circumferential surface of the through hole or the outer circumferential surface of the penetration pin. This elastic member is formed so that the inner circumferential surface of the circular ring can move with respect to the outer circumferential surface of the circular ring.

Since the elastic member is disposed between the through hole and the penetration pin, even though the inner circumferential surfaces of the through hole and the penetration pin are formed to be close to each other due to a manufacturing error, the elastic member is deformed so that the inner circumferential surface and the outer circumferential surface thereof are close to each other, and thus, the through hole and the penetration pin do not interfere with each other, to thereby prevent the speed reducer from being in a locked state due to interference. Thus, it is not necessary to form a sufficiently large clearance between the through hole and the penetration pin by manufacturing a small-sized penetration pin with respect to a through hole or a large-sized through hole with respect to a penetration pin, for the purpose of preventing the locked state. Further, it is not necessary to select a revolving gear or a penetration pin for assembly to prevent the speed reducer from being in a locked state due to assembly of the penetration pins manufactured to have a large size into the revolving gear having the through holes manufactured to have a small size. Thus, only by setting a small clearance between the through hole and the penetration pin without time-consuming work for component selection, it is possible to suppress a backlash between the through hole and the penetration pin while preventing the speed reducer from being in a locked state.

Further, in the above-described speed reducer according to this aspect of the invention, the elastic member may be mounted to be able to rotate with respect to the outer circumferential surface of the penetration pin.

According to this configuration, when the penetration pin moves inside the through hole, the elastic member mounted to the penetration pin moves so as to roll on the inner circumferential surface of the through hole. As a result, the sliding speed between the elastic member and the through hole is decreased to such a degree that the elastic member slides with respect to the penetration pin. As a result, it is possible to reduce friction which occurs between the through hole and the elastic member, to thereby suppress deformation of the through hole or the elastic member due to friction.

Further, the above-described speed reducer according to this aspect of the invention can realize a large reduction ratio and can remove a backlash between the through hole and the penetration pin to suppress an output delay or rattling of the second rotational shaft, and thus is particularly effective as a speed reducer used in combination with a robot hand or a robot.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments will be described in the following order, in order to clarify the content of the invention.
A. Configuration of speed reducer according to embodiment of the invention
B. Mechanism of removing gap between through hole and penetration pin by elastic ring
C. Modified examples
C-1. First modified example
C-2. Second modified example
C-3. Third modified example
D. Application example

A. CONFIGURATION OF SPEED REDUCER ACCORDING TO EMBODIMENT OF THE INVENTION

Figure 1:
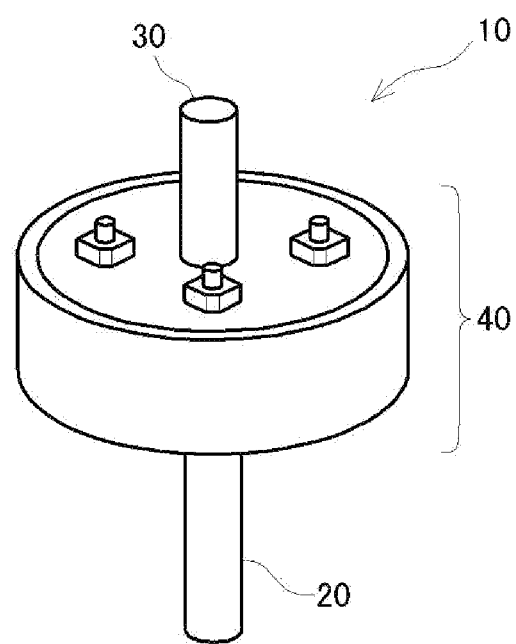
FIG. 1 is a diagram illustrating an appearance of a speed reducer according to an embodiment of the invention.

FIG. 1 is a diagram illustrating an appearance of a speed reducer 10 according to an embodiment of the invention. As shown in FIG. 1, the speed reducer 10 of the present embodiment includes an input shaft 20 (first rotational shaft) which is installed on a bottom surface side of a cylindrical main body section 40, and an output shaft 30 (second rotational shaft) which is installed on an upper surface side of the main body section 40. If the input shaft 20 is rotated in a state where the main body section 40 is fixed, its rotation is reduced in speed by a mechanism in the main body section 40 and is output through the output shaft 30 which is fixed in the center of an upper cover plate 104.

Figure 2:
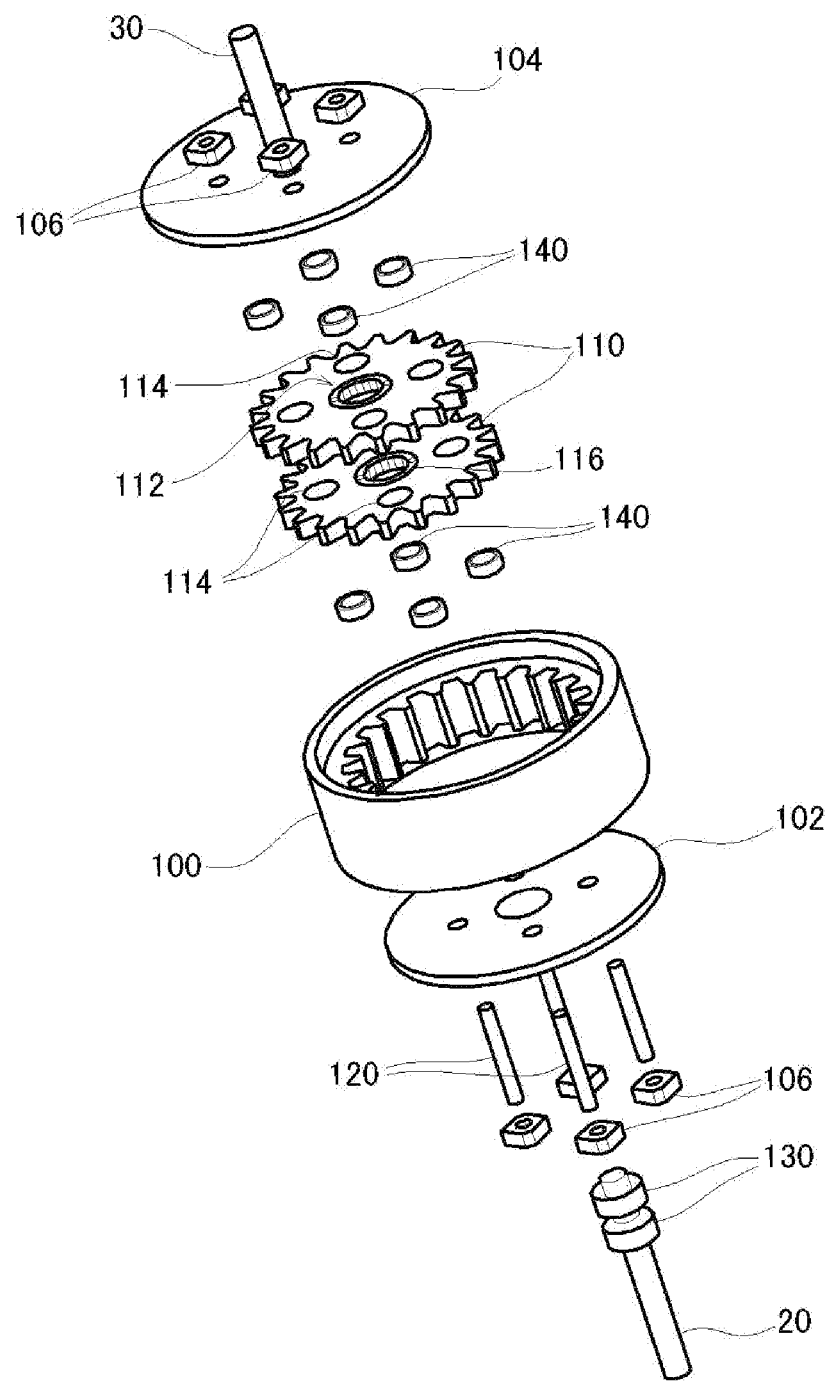
FIG. 2 is an exploded perspective view illustrating an internal structure of a speed reducer according to an embodiment of the invention.

FIG. 2 is an explored perspective view illustrating an internal structure of the speed reducer 10 according to the present embodiment. As shown in the figure, in the speed reducer 10 of the present embodiment, a plurality of gear teeth is formed on an inner circumference (hereinafter, also referred to as an inner circumferential side) of a cylindrical member which forms an outer circumference of the main body section 40, to form a ring gear 100. Further, a revolving gear 110 which is smaller in size than the ring gear 100 and which is formed with a plurality of gear teeth on an outer circumference (hereinafter, also referred to as an outer circumferential side) is installed inside the ring gear 100. A shaft hole 112 is formed in the center of the revolving gear 110, and an eccentric cam 130 (circular cam) which is installed in the input shaft 20 is inserted in the shaft hole 112 to be able to rotate through a bearing 116. In the speed reducer 10 of the present embodiment, two revolving gears 110 are installed inside the ring gear 100, which will be described in detail.

Further, through holes 114 are installed in four locations on a concentric circle, when seen from the center of the revolving gear 110, in the revolving gear 110. A penetration pin 120 for extracting the rotating motion of the revolving gear 110 is inserted in each through hole 114. A method of extracting the rotating motion of the revolving gear 110 by the penetration pin 120 will be described later. These penetration pins 120 are attached to the upper cover plate 104 which forms an upper surface of the main body section 40 at their upper end portions, and are attached to a lower cover plate 102 which forms a lower surface of the main body section 40 at their lower end portions. Further, as a nut 106 is coupled to an end portion of the penetration pin 120 which protrudes from the upper cover plate 104 and the lower cover plate 102, the penetration pin 120 is fixed to the upper cover plate 104 and the lower cover plate 102.

Further, in the speed reducer 10 of the present embodiment, an annular elastic ring 140 (elastic member) is engaged with each of four through holes 114 which are installed in the revolving gear 110. The reason why these elastic rings 140 are installed will be described later.

FIGS. 3A to 3I are diagrams illustrating an operation principle of the speed reducer 10 of the present embodiment. As described above with reference to FIG. 2, the revolving gear 110 which is smaller in size than the ring gear 100 is installed inside the ring gear 100, and the ring gear 100 and the revolving gear 110 are engaged with each other in one location. Accordingly, the revolving gear 110 is in a state of being eccentric to the central position of the ring gear 100. Further, the shaft hole 112 is formed in the center of the revolving gear 110, and the eccentric cam 130 is inserted in the shaft hole 112 through the bearing 116 (see FIG. 2). Thus, if the input shaft 20 rotates, the eccentric cam 130 rotates, which generates a revolving motion centering around the input shaft 20 (and central axis of the ring gear 100) in the revolving gear 110. Further, the revolving gear 110 and the eccentric cam 130 are able to rotate with respect to each other through the bearing 116, and the revolving gear 110 is engaged with the ring gear 100 by the gear teeth. Thus, while rotating by the engagement with the gear teeth of the ring gear 100, the revolving gear 110 revolves around the input shaft 20 (and the central axis of the ring gear 100).

Figure 3:
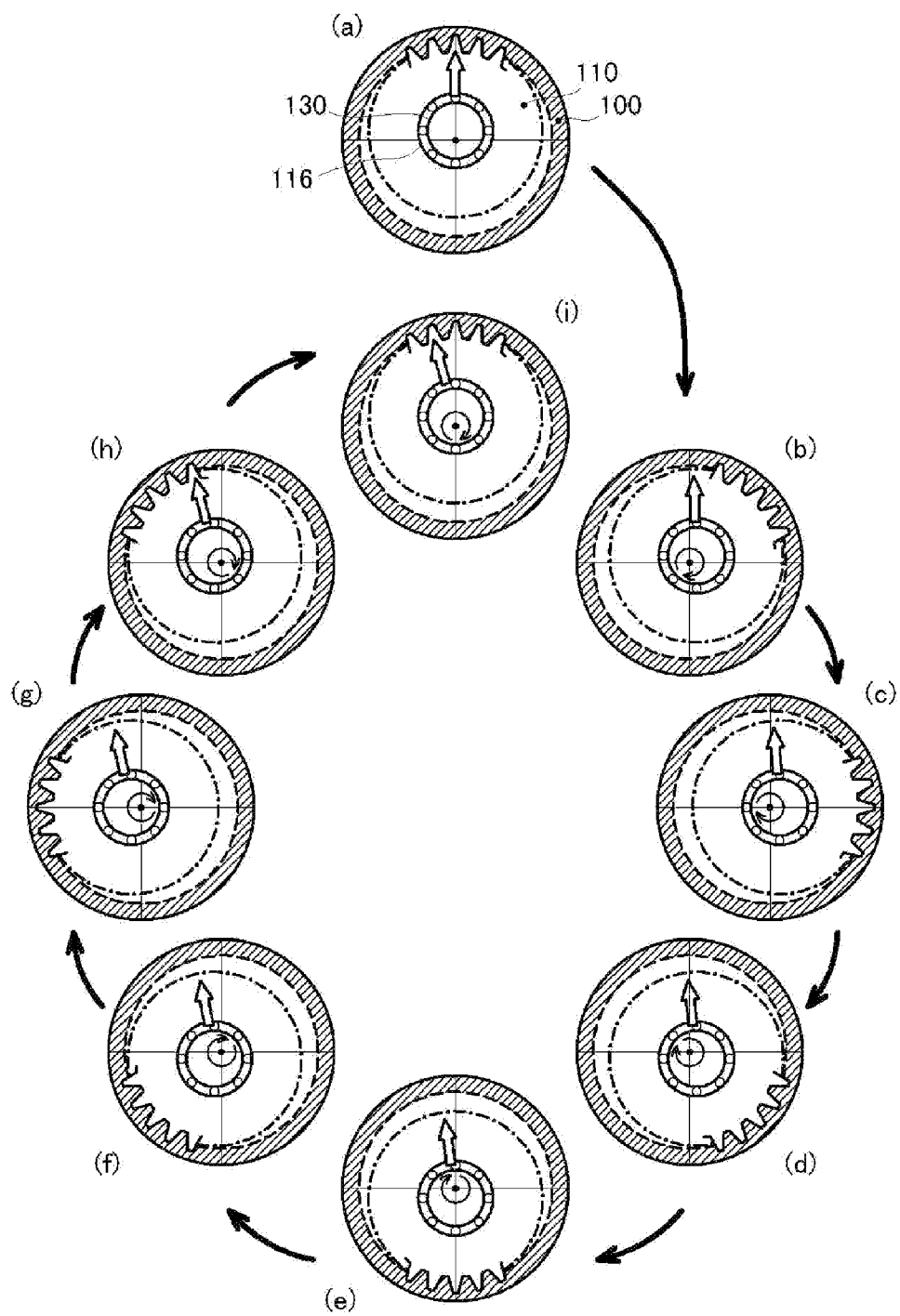
FIGS. 3A to 3I are diagrams illustrating an operation principle of a speed reducer according to an embodiment of the invention.

FIG. 3A shows a state where the eccentric cam 130 is eccentric on the upper side of the figure and accordingly the revolving gear 110 is engaged with the ring gear 100 on the upper side of the figure. In FIGS. 3A to 3I, an arrow is drawn on a side surface of the revolving gear 110 to confirm a state where the revolving gear 110 rotates. This arrow indicates a central uppermost portion in the figure in the state of FIG. 3A.

If the input shaft 20 rotates by 45 degrees in the clockwise direction from the state shown in FIG. 3A, the revolving gear 110 also revolves by 45 degrees in the clockwise direction by the motion of the eccentric cam 130. Further, since the revolving gear 110 is engaged with the ring gear 100, the revolving gear 110 rotates in the anticlockwise direction by an angle corresponding to the number of gear teeth. As a result, the revolving gear 110 enters into a state shown in FIG. 3B. As is obvious from comparison of FIG. 3A and FIG. 3B, as the eccentric cam 130 rotates by 45 degrees in the clockwise direction, the revolving gear 110 also revolves by 45 degrees in the clockwise direction, and moves to an eccentric position on an upper right side in the figure. Further, the direction of the arrow drawn in the revolving gear 110 indicates an approximately uppermost portion in the figure in a similar way to FIG. 3A. It can be considered that this is caused because the rotation in the anticlockwise direction generated in the revolving gear 110 by the engagement with the ring gear 100 approximately negates the revolution in the clockwise direction when the revolving gear 110 revolves in the clockwise direction.

If the input shaft 20 further rotates by 45 degrees in the clockwise direction from the state shown in FIG. 3B, the revolving gear 110 moves to a position shown in FIG. 3C. This state is a state where the revolving gear 110 revolves by 90 degrees in the clockwise direction with respect to the state shown in FIG. 3A. Further, as the revolving gear 110 revolves to this position while being engaged with the ring gear 100, the revolving gear 110 rotates in the anticlockwise direction by an angle corresponding to the number of gear teeth. Further, the direction of the arrow drawn in the revolving gear 110 is still in a state of indicating an approximately uppermost portion in the figure, in a similar way to FIG. 3B.

If the input shaft 20 further rotates in the clockwise direction from the state shown in FIG. 3C, the revolving gear 110 moves to a state shown in FIG. 3D, a state shown in FIG. 3E, a state shown in FIG. 3F, and a state shown in FIG. 3H. Here, if the input shaft 20 rotates just one turn, it enters into a state shown in FIG. 3I. Further, the direction of the arrow drawn in the revolving gear 110 rotates in the anticlockwise direction by one gear tooth, compared with the state of FIG. 3A. That is, the revolution in the clockwise direction and the rotation in the anticlockwise direction generated in the revolving gear 110 have angles which are approximately negated with respect to each other. However, strictly speaking, the angle of the rotation is larger than that of the revolution by one gear tooth for each revolution. This is because, since the number of gear teeth of the revolving gear 110 is smaller than the number of gear teeth of the ring gear 100 by one tooth, the revolving gear 110 should further rotate in the anticlockwise direction once and by one tooth so that the revolving gear 110 revolves once in the clockwise direction while being engaged with the ring gear 100.

In this way, in the speed reducer 10 according to the present embodiment, if the input shaft 20 rotates once, the revolving gear 110 rotates reversely by the number of gear teeth corresponding to the gear teeth number difference with the ring gear 100. For example, if the number of gear teeth of the ring gear 100 is 50 and the number of gear teeth of the revolving gear 110 is 49, the revolving gear 110 rotates reversely by one fiftieth rotation whenever the input shaft 20 rotates once (accordingly, 360 degrees/50=7.2 degrees).

Further, the motion of the revolving gear 110 when the input shaft 20 rotates may be performed as follows. Firstly, if the input shaft 20 rotates, the revolving gear 110 revolves around the input shaft 20 (and the central axis of the ring gear 100) by the eccentric cam 130. On the other hand, since the revolving gear 110 is engaged with the ring gear 100, the revolving gear 110 rotates while rolling on the ring gear 100.

Here, the revolving gear 110 is formed to be slightly smaller in size than the ring gear 100. Accordingly, even though the revolving gear 110 does not approximately rotate in reality, the revolving gear 110 can roll on the ring gear 100, only by slightly moving the revolving gear 110 in parallel. For example, in the states shown in FIGS. 3A and 3B, the revolving gear 110 scarcely rotates and slightly moves in a lower right direction. Nevertheless, the position where the revolving gear 110 is engaged with the ring gear 100 moves by 45 degrees from the central position of the ring gear 100. That is, the revolving gear 110 rolls on the ring gear 100. Similar to the states shown in FIGS. 3B and 3C, the revolving gear 110 scarcely rotates and slightly moves in the approximately lower right direction. Nevertheless, the position where the revolving gear 110 is engaged with the ring gear 100 further moves by 45 degrees. That is, the revolving gear 110 rolls on the ring gear 100.

In this way, if the revolving gear 110 is formed to be slightly smaller in size than the ring gear 100, it is possible to allow the revolving gear 110 to roll on the ring gear 100 almost without rotation, only by moving (fluctuating) the revolving gear 110 to vibrate and rotate. Further, during a period when the revolving gear 110 returns to the original position (for example, the position shown in FIG. 3A or 3I), only rotation of the angle corresponding to the gear teeth number difference between the ring gear 100 and the revolving gear 110 is generated.

If the input shaft 20 rotates once as described above, the revolving gear 110 fluctuates once. This shows that the revolving gear 110 severely fluctuates if the input shaft 20 rotates at high speed, and accordingly, it is likely that vibration is generated. However, as described above, two revolving gears 110 are installed (see FIG. 2) in the speed reducer 10 of the present embodiment, and these revolving gears 110 revolve to deviate from each other by half a cycle. Thus, the vibration generated by the fluctuation of the one revolving gear 110 is negated by the vibration due to the fluctuation of the other revolving gear 110, and thus, it is possible to prevent vibration from occurring in the entire speed reducer 10.

As described above, even though the revolving gears 110 of the present embodiment revolves, the revolving gears 110 only slightly fluctuate inside the ring gear 100 while slightly rotating. In this view, it can be considered that the rotation of the revolving gear 110 is extracted by the penetration pin 120. That is, as shown in FIG. 2, as an example, four through holes 114 are installed in the revolving gear 110 of the present embodiment, and the penetration pins 120 are respectively inserted in the through holes 114. Here, if the size of the though hole 114 is set to be larger than the diameter of the penetration pin 120 to a certain degree, it is possible to absorb the fluctuating motion of the revolving gear 110 inside the ring gear 100 by the clearance between the through hole 114 and the penetration pin 120, thereby extracting only the rotation of the revolving gear 110. Hereinafter, this will be described.

Figure 4:
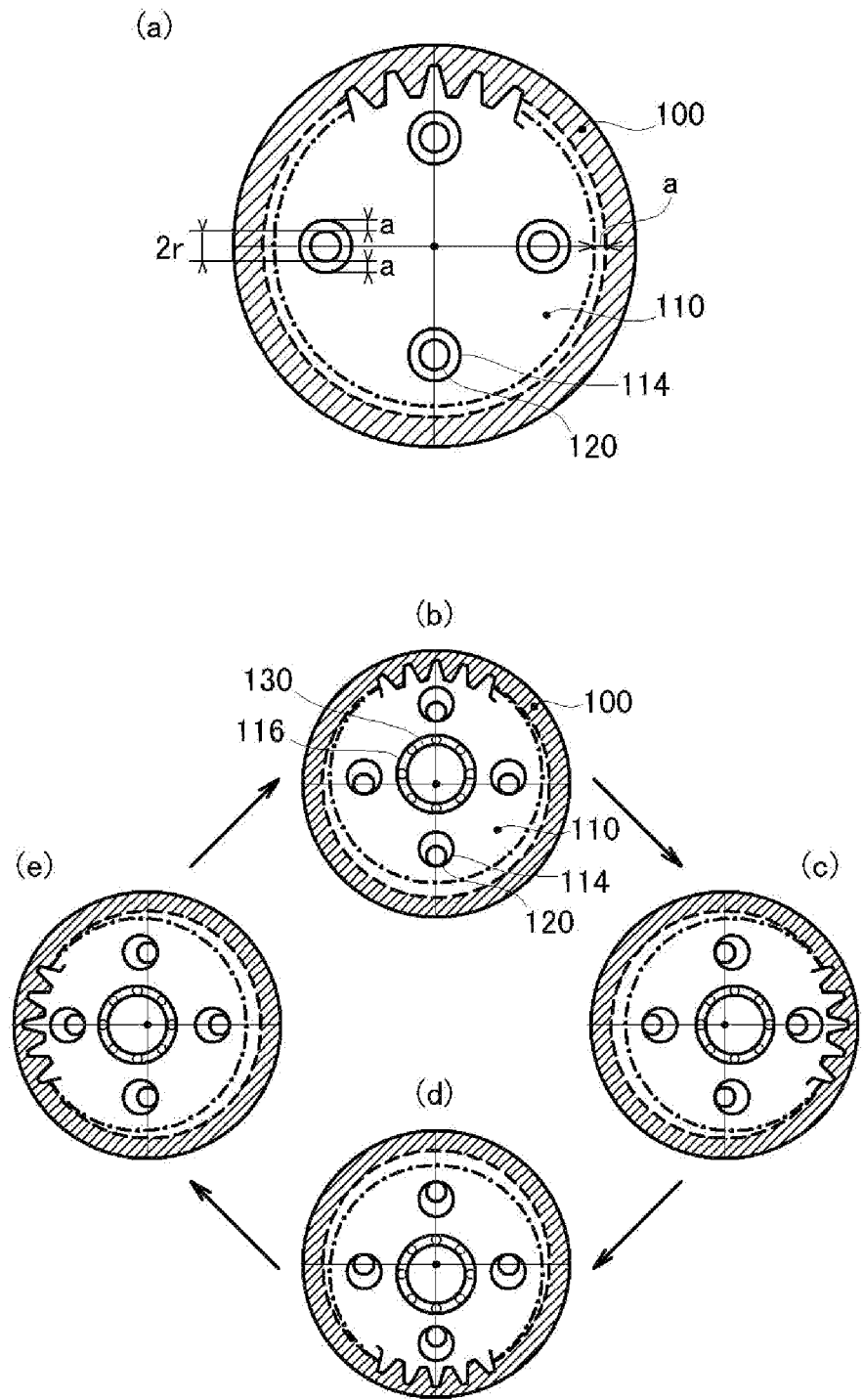
FIGS. 4A to 4E are diagrams illustrating a state where rotation of a revolving gear is extracted by penetration pins.

FIGS. 4A to 4E are diagrams illustrating a state where the rotation of the revolving gear 110 is extracted by the penetration pin 120. Firstly, the size of the through hole 114 will be described. As shown in FIG. 4A, when the central position of the revolving gear 110 coincides with the central position of the ring gear 100, the through hole 114 overlaps with the position of the penetration pin 120 and is formed to be larger than the penetration pin 120 by a radius "a". Here, "a" represents the amount of eccentricity of the revolving gear 110 with respect to the central position of the ring gear 100.

The revolving gear 110 which is formed with the through holes 114 in this way is eccentric toward the upper side in the figure by the eccentric cam 130. Then, since the revolving gear 110 is eccentric toward the upper direction by the length "a", as shown in FIG. 4B, the lower side of the through hole 114 enters into contact with an outer circumferential surface of the penetration pin 120.

Further, if the revolving gear 110 is eccentric toward the right side in the figure by the eccentric cam 130, as shown in FIG. 4C, the left side of the through hole 114 enters into contact with the penetration pin 120. Similarly, if the revolving gear 110 is eccentric toward the lower side in the figure, as shown in FIG. 4D, the upper side of the through hole 114 enters into contact with penetration pin 120, and if the revolving gear 110 is eccentric toward the left side in the figure, as shown in FIG. 4E, the through hole 114 and the penetration pin 120 are in contact with each other on the right side of the through hole 114.

In this way, in the speed reducer 10 of the present embodiment, by setting the size of the through hole 114 to be larger than the penetration pin 120 by the size corresponding to the amount of eccentricity "a", it is possible to absorb the fluctuating motion of the revolving gear 110 inside the ring gear 100. "Setting the size of the through hole 114 to be larger than the penetration pin 120 by the size corresponding to the amount of eccentricity "a"" means that the radius of the through hole 114 is set to be larger than the radius of the penetration pin 120 by the amount of eccentricity "a" or the diameter of the through hole 114 is set to be two times (2a) the amount of eccentricity "a" larger than the diameter of the penetration pin 120. On the other hand, if the revolving gear 110 rotates, since the position of the through hole 114 moves, this motion is transmitted to the penetration pin 120. Thus, it is possible to extract the rotating motion of the revolving gear 110.

The rotation of the extracted revolving gear 110 in this way is transmitted to the upper cover plate 104 and the lower cover plate 102 (see FIG. 2) to which the penetration pin 120 is attached. As a result, the rotation of the revolving gear 110 from the output shaft 30 which is fixed to the upper cover plate 104 is output to the outside of the speed reducer 10.

Here, as is obvious from FIGS. 4B to 4E, if the revolving gear 110 fluctuates inside the ring gear 100, the through holes 114 and the penetration pins 120 are in contact with each other in any one location, and its contact location constantly moves. Accordingly, if any one location where the clearance between the through hole 114 and the penetration pin 120 is excessively small is present, the through hole 114 and the penetration pin 120 interfere with each other, and thus, the speed reducer 10 enters into a locked state. Since it is not possible to avoid a slight manufacturing error when manufacturing the through hole 114 or the penetration pin 120, it is necessary to slightly increase the clearance between the through hole 114 and the penetration pin 120 in order to prevent such a problem.

Thus, in the speed reducer 10 having such an operational principle in the present embodiment, due to the gap (clearance) between the through hole 114 and the penetration pin 120, there is a problem that torque transmission between the through hole 114 and the penetration pin 120 is delayed corresponding to this backlash to cause a period when an output torque cannot not obtained, or the output shaft 30 rattles even though the input shaft 20 is stopped. Thus, in the speed reducer 10 according to the present embodiment, by adopting a structure in which the elastic ring 140 is disposed between the through hole 114 and the penetration pin 120, such a problem is prevented.

B. MECHANISM OF REMOVING BACKLASH BETWEEN THROUGH HOLE AND PENETRATION PIN BY ELASTIC RING

Figure 5:
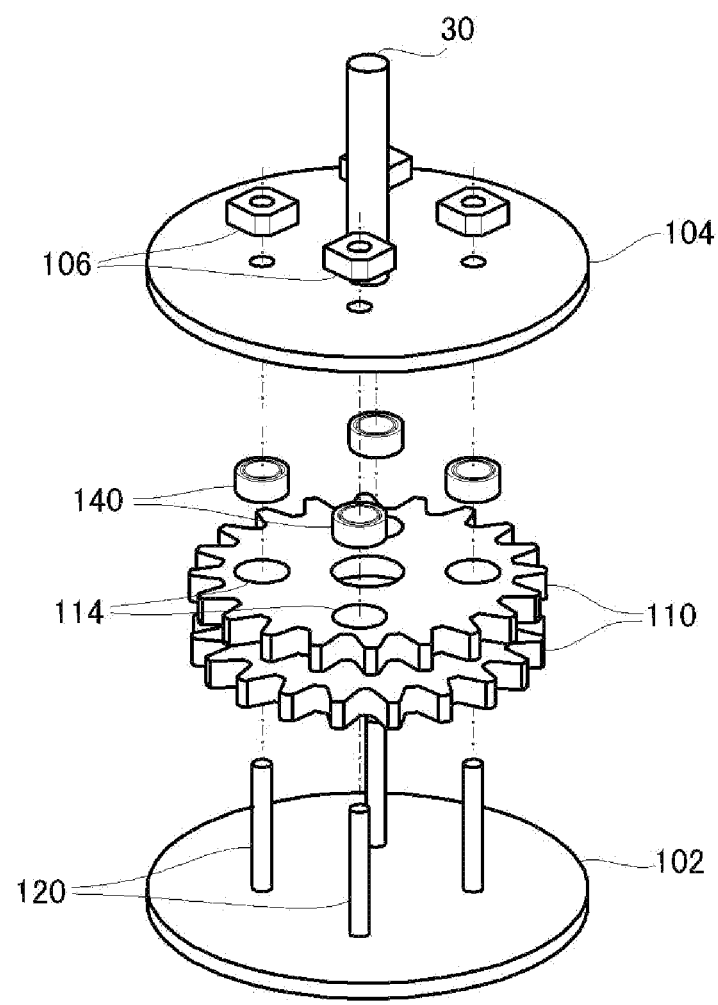
FIG. 5 is a diagram illustrating a state where elastic rings are assembled in through holes.

FIG. 5 is a diagram illustrating a state where the elastic rings 140 are assembled in the through holes 114. In FIG. 5, the elastic rings 140 are already assembled to the lower revolving gear 110, and the elastic rings 140 and the upper cover plate 104 are being assembled to the upper revolving gear 110. Hereinafter, a method of assembling the elastic rings 140 and the like to the upper revolving gear 110 will be described, but the elastic rings 140 and the like can also be assembled to the lower revolving gear 110 in a similar manner.

As shown in the figure, in the speed reducer 10 of the present embodiment, four through holes 114 are formed in the revolving gear 110, and the elastic ring 140 is inserted into each through hole 114. The elastic ring 140 is an annular member which is formed of a metallic material. A detailed structure of the elastic ring 140 will be described later. Further, the outer diameter of the elastic ring 140 is formed to be slightly larger than the inner diameter of the through hole 114. Thus, when the elastic ring 140 is inserted in the through hole 114, the elastic ring 140 is fixed in the through hole 114. In the through hole 114 of the present embodiment, the inner diameter of the elastic ring 140 is set to be larger than the penetration pin 120 by the radius "a" in a state where the elastic ring 140 is inserted in the through hole 114.

In this way, after the elastic ring 140 is inserted into each of four through holes 114, the penetration pin 120 is inserted into the through hole 114, and then, the upper end portion of the penetration pin 120 is inserted in the through hole of the upper cover plate 104. Thereafter, a nut 106 is coupled to the penetration pin 120 which protrudes from the upper cover plate 104, thereby completing assembly of the speed reducer 10.

Figure 6:
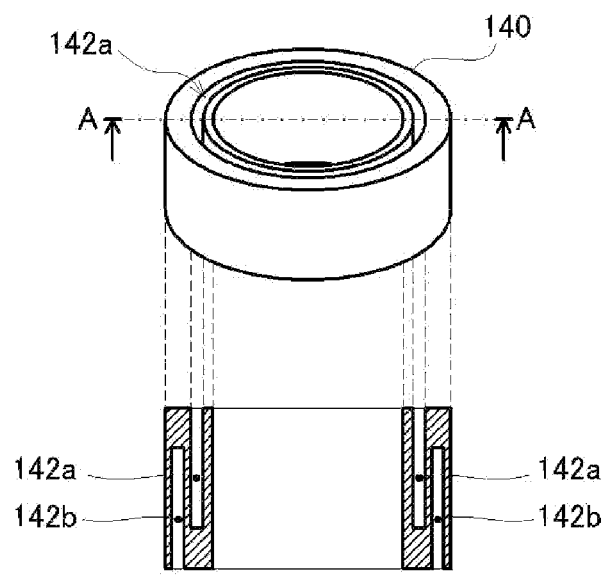
FIG. 6 is a diagram illustrating a structure of an elastic ring according to an embodiment of the invention.

FIGS. 6A and 6B are diagrams illustrating a structure of the elastic ring 140 according to the present embodiment. Here, FIG. 6A is an enlarged view of the elastic ring 140 according to the present embodiment, when seen from the upper side of the ring, and FIG. 6B shows an internal structure of the elastic ring 140, when a cross-section AA of the elastic ring 140 shown in FIG. 6A, is seen from the arrow direction.

As shown in FIG. 6A, in the elastic ring 140 according to the present embodiment, a hole in which the penetration pin 120 is inserted is formed in the center of the ring, and a groove (inner groove 142a) which is circular and narrow is formed slightly outside the hole. As shown in FIG. 6B, the inner groove 142a is dug down to a position slightly above the lower surface of the ring, from the upper surface of the elastic ring 140. Further, although not viewed in a state where the elastic ring 140 is seen from the upper side (state shown in FIG. 6A), but a groove (outer groove 142b) which is circular and narrow is also formed on a lower surface side of the elastic ring 140. As shown in FIG. 6B, the outer groove 142b is formed further outside the inner groove 142a, which is dug up to a position slightly below the upper surface of the ring from the lower surface of the elastic ring 140.

In the elastic ring 140 of the present embodiment in which such grooves are formed, a thick portion of the elastic ring 140 has such a structure that thin metal plates overlap with each other in a layered form. Thus, if a force is applied in a direction where the thickness of the elastic ring 140 is deformed, the elastic ring 140 is compressed in a portion where the force is applied, and if the applied force is released, the thickness of the elastic ring 140 returns to the original state.

Figure 7:
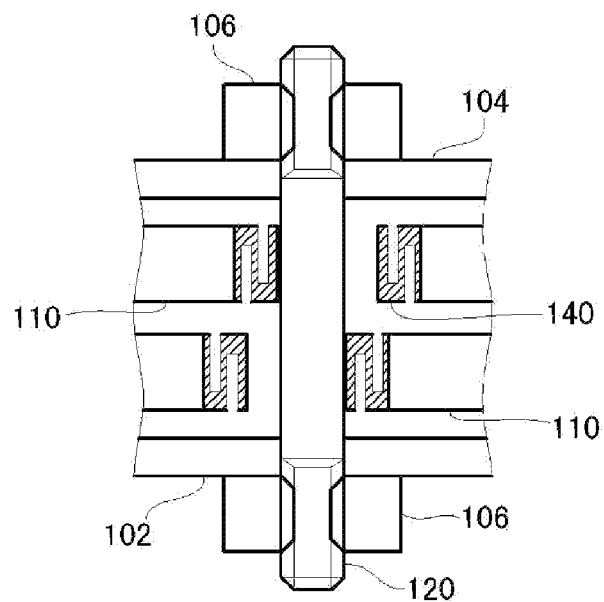
FIG. 7 is a diagram illustrating a state where elastic rings are assembled in through holes, as a sectional view taken along a central axis of a certain penetration pin.

FIG. 7 is a diagram illustrating a state where the elastic rings 140 are assembled in the through holes 114, as a sectional view taken along a central axis of a certain penetration pin 120. As shown in the figure, the elastic rings 140 are fixed in the through holes 114. Further, since the penetration pin 120 is eccentric with respect to the through holes 114, the penetration pin 120 is also eccentric with respect to the elastic rings 140. Here, as described above, the inner diameter of the elastic ring 140 according to the present embodiment is formed to be larger than the penetration pin 120 by the radius "a" (see FIG. 5). Since the value of radius "a" corresponds to the amount of eccentricity of the revolving gear 110 (the amount of eccentricity of the penetration pin 120 with respect to the elastic ring 140), the penetration pin 120 is eccentric with respect to the elastic ring 140, and thus, the penetration pin 120 and the inner circumferential surface of the elastic ring 140 are in contact with each other.

Figure 8:
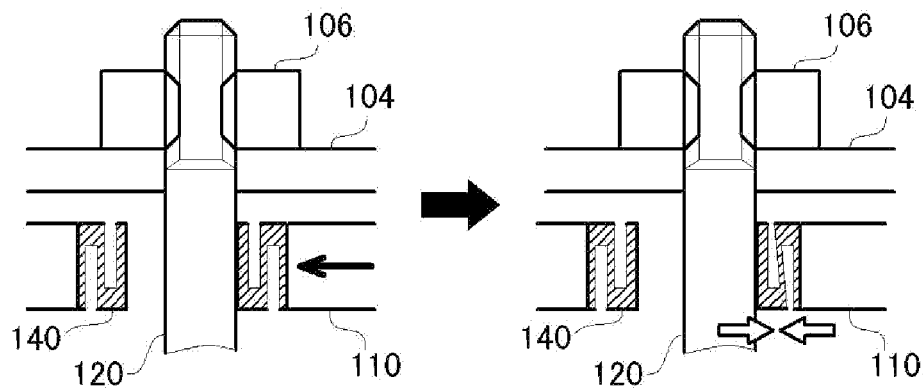
FIG. 8 is a diagram illustrating a mechanism in which a gap between a through hole and a penetration pin is removed by an elastic ring in a speed reducer according to an embodiment of the invention.

FIG. 8 is a diagram illustrating a mechanism in which a backlash between the through hole 114 and the penetration pin 120 is removed by the elastic ring 140 in the speed reducer 10 according to the present embodiment. As described above, the penetration pin 120 is eccentric with respect to the through hole 114 (and the elastic ring 140), and the penetration pin 120 and the elastic ring 140 are in contact with each other at one location. However, if the revolving gear 110 revolves, the penetration pin 120 moves in the elastic ring 140. Further, since a manufacturing error is present in the through hole 114, when the penetration pin 120 moves in the through hole 114, the distance between the through hole 114 and the penetration pin 120 may be decreased. Even in this case, in the speed reducer 10 according to the present embodiment, as shown in FIG. 8, since the elastic ring 140 is compressed between the through hole 114 and the penetration pin 120, the speed reducer is prevented from being in the locked state due to interference between the elastic ring 140 and the penetration pin 120.

Since the speed reducer 10 is not operated and is damaged in the locked state, the locked state of the speed reducer 10 should necessarily be avoided. However, the manufacturing error necessarily occurs in manufacturing the through hole 114 and the penetration pin 120. Thus, in order to prevent the locked state even in a case where the through hole 114 which is manufactured to be smaller than a medium value of a variation and the penetration pin 120 which is manufactured to be larger than a medium value of a variation are combined, it is necessary to manufacture the through hole 114 to have a slightly larger medium value and to manufacture the penetration pin 120 to have a slightly smaller medium value. As a result, a backlash necessarily occurs between the through hole 114 and the penetration pin 120. Particularly, in a case where the through hole 114 is manufactured to be larger than the medium value and the penetration pin 120 is manufactured to be smaller than the medium value, a large backlash occurs. Of course, by measuring the sizes of the through hole 114 and the penetration pin 120, by selecting the through hole 114 and the penetration pin 120 in advance, and by combining the large through pin 120 with the through hole 114 which is manufactured to have a large size and by combining the small through pin 120 with the through hole 114 which is manufactured to have a small size, it is possible to suppress such a problem. However, in order to selectively combine the through hole 114 and the penetration pin 120, great efforts are necessary and the manufacturing cost is considerably increased.

In this regard, in the speed reducer 10 according to the present embodiment, it is possible to prevent the speed reducer 10 from being in the locked state by the elastic rings 140 which are disposed between the through holes 114 and the penetration pins 120. Thus, in order to prevent the locked state, it is not necessary to form a sufficiently large clearance between the through hole 114 and the penetration pin 120, and to set the clearance to be small to that extent. As a result, it is possible to suppress the backlash between the through hole 114 and the penetration pin 120, and it is thus possible to prevent occurrence of a period when the torque transmission is delayed by the backlash and the output torque cannot be obtained or the rattling of the output shaft 30. Further, it is not necessary to perform time-consuming work for selection of the through hole 114 and the penetration pin 120.

Hereinbefore, a case where position deviation of the through hole 114 is generated due to a manufacturing tolerance has been described as an example, but even in a case where position deviation of the penetration pin 120 is generated due to a manufacturing tolerance or in a case where the inner circumferential surface of the through hole 114 (or the outer circumferential surface of the penetration pin 120) cannot be formed in a perfect circular shape, the interval between the through hole 114 and the penetration pin 120 may be decreased. Even in such a case, since the elastic ring 140 is compressed between the through hole 114 and the penetration pin 120 as described above, the speed reducer 10 is prevented from being in the locked state.

C. MODIFIED EXAMPLES

Some modified examples may be considered in the above-described embodiment. Hereinafter, these modified examples will be briefly described. In the following modified examples, the same components as in the above-described embodiment are given the same reference numerals as in the above-described embodiment, and its detailed description is omitted.

C-1. First Modified Example

In the speed reducer 10 of the above-described embodiment, even though the gap between the through hole 114 and the penetration pin 120 is narrow due to the influence of the manufacturing error, the elastic ring 140 is deformed to be compressed, to thereby prevent the speed reducer 10 from being in the locked state. As described above, it is possible to narrow the gap between the through hole 114 and the penetration pin 120, only by preventing the locked state. In addition, in a case where the gap between the through hole 114 and the penetration pin 120 is wide due to the influence of the manufacturing error, the elastic ring 140 may be deformed to fill the gap.

Figure 9:
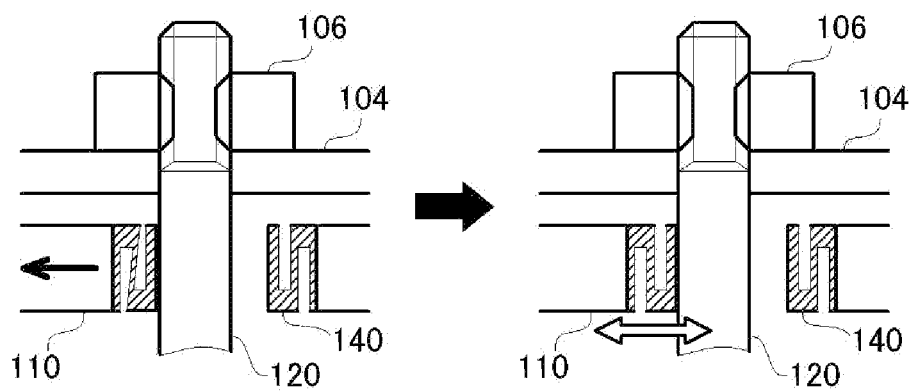
FIG. 9 is a diagram illustrating a state where an elastic ring according to a first modified example is installed in a through hole.

FIG. 9 is a diagram illustrating a state where the elastic ring 140 according to a first modified example is installed in the through hole 114. The elastic ring 140 shown in FIG. 9 is formed so that the inner diameter of the elastic ring 140 is slightly smaller than the inner diameter of the elastic ring 140 in the embodiment shown in FIG. 7. If the penetration pin 120 is inserted into this elastic ring 140, as shown on the left side in FIG. 9, the elastic ring 140 is slightly compressed by the penetration pin 120. Here, the elastic ring 140 does not reach its elastic limit yet, and is still in a state of being capable of sufficient compression.

In the speed reducer 10 according to the first modified example as described above, if the gap between the through hole 114 and the penetration pin 120 is widened due to the manufacturing error of the through hole 114 or the penetration pin 120, as shown on the right side in FIG. 9, the elastic ring 140 which is compressed in advance returns to the original thickness. Thus, since the elastic ring 140 and the penetration pin 120 are maintained in a state of being in constant contact with each other, it is possible to prevent the gap between the through hole 114 and the penetration pin 120 from being generated. Since the elastic ring 140 is disposed between the through hole 114 and the penetration pin 120, the speed reducer 10 is prevented from being in the locked state due to the manufacturing error of the through hole 114 or the penetration pin 120.

C-2. Second Modified Example

In the speed reducer 10 according to the above-described embodiment and the first modified example, the elastic ring 140 is inserted in the through hole 114. However, the elastic ring 140 may be engaged with the penetration pin 120.

Figure 10:
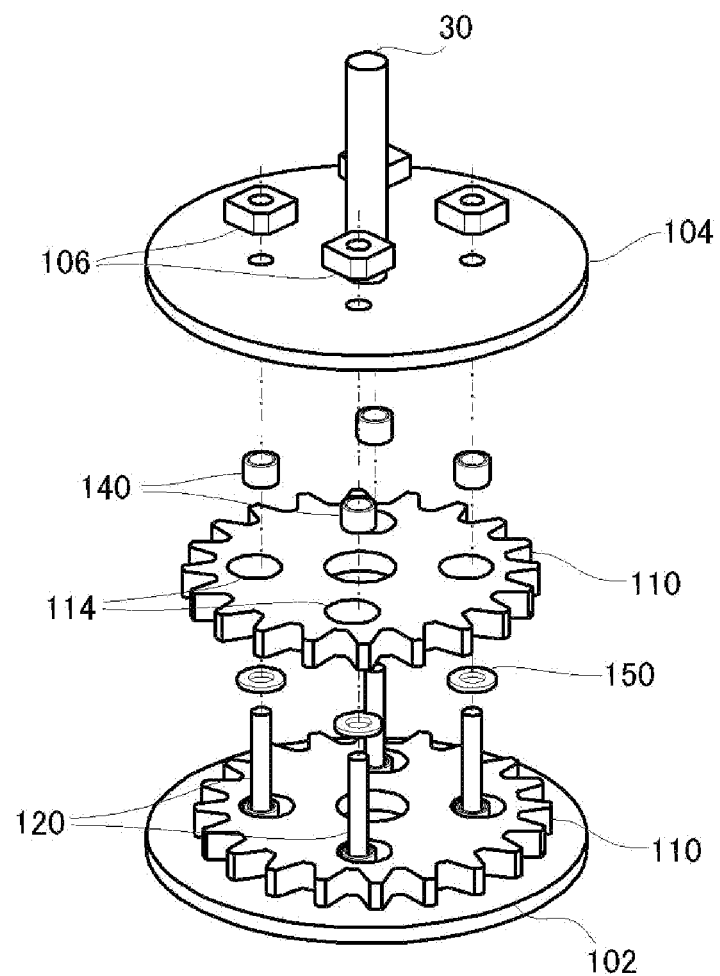
FIG. 10 is a diagram illustrating a state where elastic rings are engaged with penetration pins in a speed reducer according to a second modified example.

FIG. 10 is a diagram illustrating a state where the elastic ring 140 is combined with the penetration pin 120 in the speed reducer 10 according to a second modified example.

In FIG. 9, a state where the elastic rings 140 and the like are already assembled to the lower revolving gear 110 and the elastic rings 140, the upper cover plate 104 and the like are being assembled to the upper revolving gear 110 is shown. Hereinafter, a method of assembling the elastic rings 140 and the like to the upper revolving gear 110 will be described, but the elastic rings 140 and the like may be assembled to the lower revolving gear 110 in a similar manner.

The outer diameter of the elastic ring 140 according to the modified example shown in FIG. 10 is formed to be slightly smaller than the inner diameter of the through hole 114 by the radius "a" (the amount of eccentricity of the revolving gear 110). Further, the inner diameter of the elastic ring 140 is formed to have an inner diameter which allows rotation with respect to the penetration pin 120. When such an elastic ring 140 is engaged with the penetration pin 120, firstly, a washer 150 is engaged with the penetration pin 120. Then, the washer 150 slides down along the penetration pin 120 and then is stopped being in contact with the elastic ring 140 which is assembled to the lower revolving gear 110. Further, if the elastic ring 140 is engaged from the top of the washer 150, the elastic ring 140 is stopped being in contact with the washer 150. In this state, the elastic ring 140 is positioned at the same height as the through hole 114 of the upper revolving gear 110. In this way, after the elastic rings 140 are engaged with four penetration pins 120, the upper cover plate 104 is installed from the top of the elastic rings 140, and the nuts 106 are coupled to the penetration pins 120 which protrude from the upper cover plate 104, to thereby complete the speed reducer 10.

Figure 11:
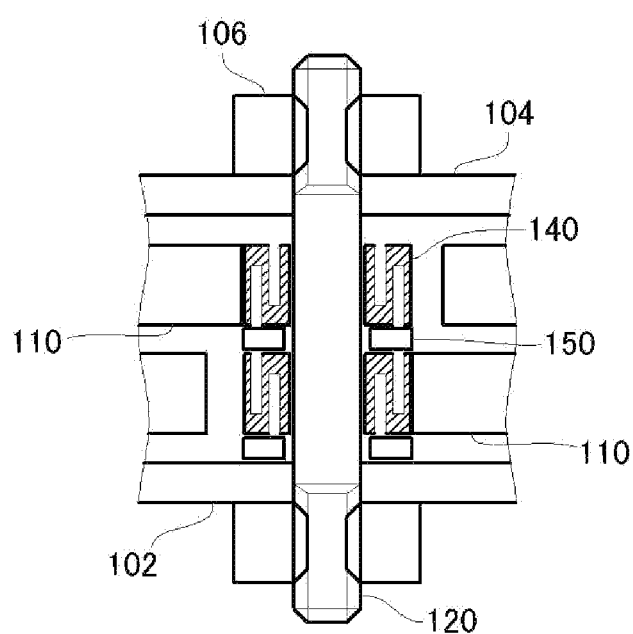
FIG. 11 is an enlarged view illustrating a peripheral state of through holes in a speed reducer according to a second modified example.

FIG. 11 is an enlarged view illustrating a peripheral state of the through holes 114 in the speed reducer 10 according to the second modified example. As shown in the figure, the penetration pin 120 is eccentric with respect to the through holes 114, and accordingly, the elastic rings 140 which are engaged with the penetration pin 120 are also eccentric with respect to the through holes 114. Further, as described above, since the outer diameter of the elastic ring 140 is formed to be smaller than the inner diameter of the through hole 114 by the radius "a" (the amount of eccentricity of the revolving gear 110), the elastic ring 140 and the inner circumferential surface of the through hole 114 are in contact with each other in a state where the elastic ring 140 is eccentric.

Even though the elastic ring 140 is engaged with the penetration pin 120 in this way, since the locked state of the speed reducer 10 can be prevented without a sufficiently large clearance between the through hole 114 and the penetration pin 120, it is possible to prevent the above-mentioned problem due to generation of the backlash. Further, since the elastic ring 140 is engaged with the penetration pin 120 in the state of being able to rotate, when the penetration pin 120 moves in the through hole 114, the elastic ring 140 moves while rolling on the inner circumferential surface of the through hole 114. Accordingly, it is possible to reduce friction generated between the through hole 114 and the elastic ring 140, and it is thus possible to suppress the through hole 114 or the elastic ring 140 from being deformed due to the friction.

C-3. Third Modified Example

In the above-described embodiment and the modified examples, the elastic ring 140 is formed by cutting a metallic material of a circular ring shape. However, the elastic ring 140 may be formed by the following method.

Figure 12A:
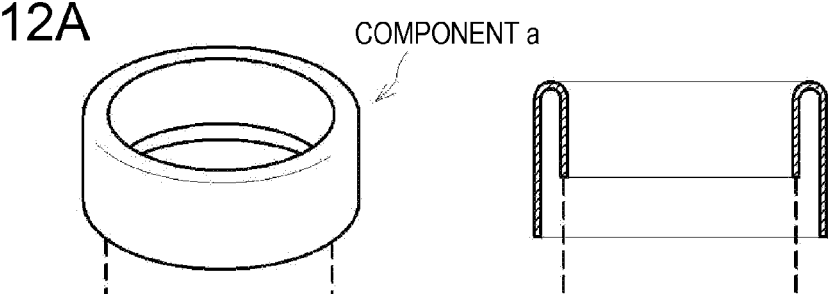
FIGS. 12A to 12C are diagrams illustrating a method of forming an elastic ring according to a third modified example.
Figure 12B:
Figure 12C:
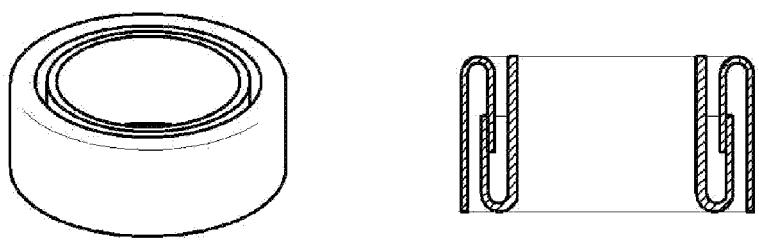

FIGS. 12A to 12C are diagrams illustrating a method of forming an elastic ring 140 according to a third modified example. The elastic ring 140 according to the third modified example is formed by combining two components of an approximately circular cylinder shape. Here, FIG. 12A shows an appearance shape of one component (component a), and FIG. 12B shows an appearance shape of the other component (component b). Further, FIG. 12C shows an appearance shape of the elastic ring 140 which is formed by combining the component a and the component b. Further, on the right sides of the appearance diagrams of the component a, the component b and the elastic ring 140, internal structures thereof are shown in cross-sectional views taken along the cylindrical centers of the respective components (or the elastic ring 140).

As shown in FIG. 12A, the component a is a member having a shape of an approximately circular cylinder, and has a shape in which the upper end portion of the cylinder is folded inside. Further, as shown in FIG. 12B, the component b is a member having a shape of an approximately circular cylinder which is smaller than the component a by one turn, and has a shape in which the lower end portion of the cylinder is folded outside. In the component a and the component b, if the component a is engaged with the component b from the top thereof in a state where the central positions of the component a and the component b coincide with each other, the components are integrally engaged with each other in the folded portions thereof. As a result, as shown in FIG. 12C, the elastic ring 140 having the same structure as the above-described elastic ring 140 (see FIG. 6) is formed.

The component a and the component b as described above have simple structures, and thus can be easily manufactured by press working or the like. Further, the elastic ring 140 can be formed only by engaging the component a with the component b. Accordingly, it is possible to simply form the elastic ring 140, compared with a case where the fine grooves are formed in the elastic ring 140 by cutting as described above.

D. APPLICATION EXAMPLE

As described above, in the speed reducer 10 according to the present embodiment, it is possible to realize a large speed ratio and to prevent output delay or rattling of the output shaft 30. Thus, the speed reducer 10 according to the present embodiment is particularly suitable as a speed reducer which is installed to a portion where a precise operation is necessary, such as a joint of a robot hand.

Figure 13A:
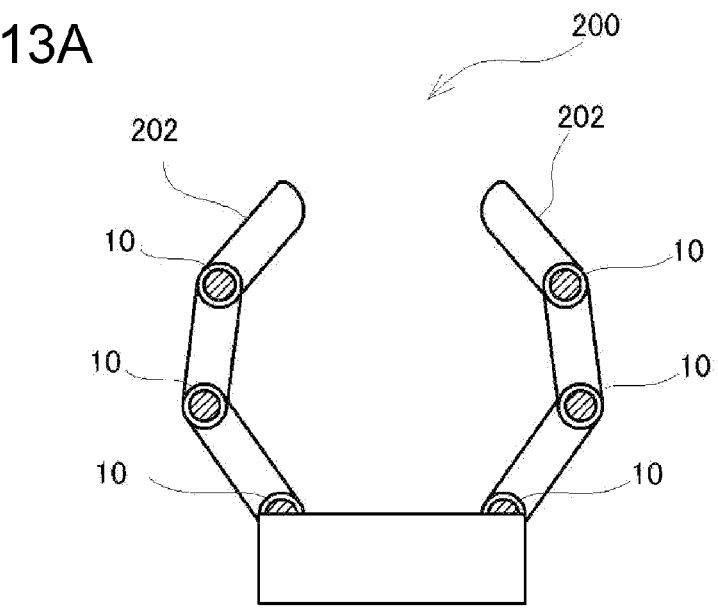
FIGS. 13A and 13B are diagrams illustrating a state where a speed reducer according to an embodiment of the invention is assembled to a joint or the like of a robot hand.
Figure 13B:
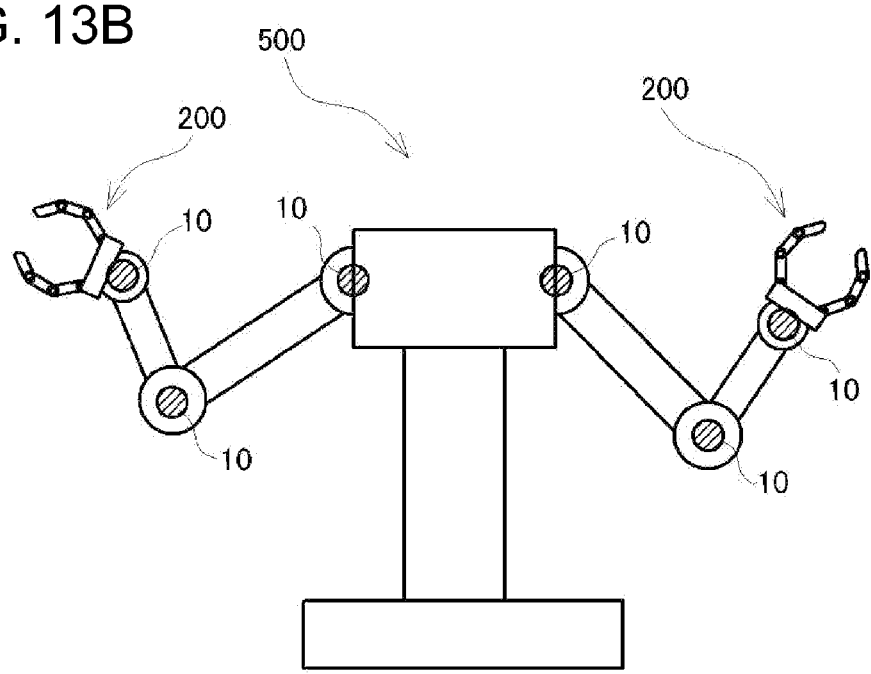

FIGS. 13A and 13B are diagrams illustrating a state where the speed reducer 10 according to the present embodiment is assembled in a joint or the like of a robot hand. In a robot hand 200 shown in FIG. 13A, joints are installed at three locations of each of two fingers 202 which face each other, and the speed reducers 10 are assembled to the joints. Further, in a robot 500 shown in FIG. 13B, the speed reducers 10 are assembled in a connection portion between an arm of the robot and the robot hand 200, an elbow of the arm, a base of the arm, or the like. Thus, an output delay of the joints in which the speed reducers 10 are assembled or rattling of the output shaft 30 is prevented, thereby making it possible to smoothen the motion of the joints.

Hereinbefore, the speed reducer according to the present embodiment has been described, but the invention is not limited thereto and may have a variety of embodiments in a range without departing from the spirit of the invention.

The entire disclosure of Japanese Patent Application No. 2011-062533, filed Mar. 22, 2011 is expressly incorporated by reference herein.

What is claimed is:

1. A speed reducer comprising:
a ring gear which is formed with a plurality of gear teeth on the inner circumference thereof;
a revolving gear which is disposed inside the ring gear, is formed with a plurality of gear teeth on the outer circumference thereof and is engaged with the ring gear;
a circular cam which is disposed to be able to rotate with respect to the revolving gear in a central position of the revolving gear;
a first rotational shaft which is vertically installed in the circular cam on the central axis of the ring gear, and rotates the circular cam around the central axis to revolve the revolving gear around the central axis;
a penetration pin which is inserted in a through hole formed in the revolving gear;
a second rotational shaft which is disposed on the central axis of the ring gear, is connected to the penetration pin, and outputs its rotation according to the rotation of the revolving gear; and
an elastic member which has a shape of a circular ring, is mounted to either an inner circumferential surface of the through hole or an outer circumferential surface of the penetration pin, and is formed so that an inner diameter of the circular ring is able to move with respect to an outer diameter of the circular ring.

2. The speed reducer according to claim 1, wherein the elastic member is mounted to be able to rotate using the penetration pin as a central axis with respect to the outer circumferential surface of the penetration pin.

3. A robot hand comprising the speed reducer according to claim 1.

4. A robot hand comprising the speed reducer according to claim 2.

5. A robot comprising:
a ring gear which is formed with a plurality of gear teeth on the inner circumference thereof;
a revolving gear which is disposed inside the ring gear, is formed with a plurality of gear teeth on the outer circumference thereof and is engaged with the ring gear;
a circular cam which is disposed to be able to rotate with respect to the revolving gear in a central position of the revolving gear;
a first rotational shaft which is vertically installed in the circular cam on the central axis of the ring gear, and rotates the circular cam around the central axis to revolve the revolving gear around the central axis;
a penetration pin which is inserted in a through hole formed in the revolving gear;
a second rotational shaft which is disposed on the central axis of the ring gear, is connected to the penetration pin, and outputs its rotation according to the rotation of the revolving gear; and
an elastic member which has a shape of a circular ring, is mounted to either an inner circumferential surface of the through hole or an outer circumferential surface of the penetration pin, and is formed so that an inner diameter of the circular ring can move with respect to an outer diameter of the circular ring.

6. The robot according to claim 5, wherein the elastic member is mounted to be able to rotate using the penetration pin as a central axis with respect to the outer circumferential surface of the penetration pin.

* * * * *